United States Patent
Collins et al.

[11] Patent Number: 5,846,461
[45] Date of Patent: Dec. 8, 1998

[54] METHOD OF MANUFACTURING CARPET PADS FROM A POLYURETHANE FOAM COMPOSITION

[75] Inventors: Burley Burk Collins, Colleyville; Miller Durrett Collins, San Antonio, both of Tex.; Charles A. Ridge, Archdale, N.C.

[73] Assignee: National Foam Cushion Manufacturing, Inc., North Richland Hills, Tex.

[21] Appl. No.: 756,239

[22] Filed: Nov. 26, 1996

[51] Int. Cl.$^6$ .......................... B29C 44/20; B29C 44/24; B29C 44/06

[52] U.S. Cl. ................. 264/45.3; 264/46.2; 264/46.5; 264/145; 264/293; 264/912

[58] Field of Search .................. 264/DIG. 69, 46.5, 264/45.3, 54, 50, 46.2, 293, 912, 145

[56] References Cited

U.S. PATENT DOCUMENTS

| | | | |
|---|---|---|---|
| 3,574,150 | 4/1971 | Jefferson et al. | 260/2.5 |
| 3,786,122 | 1/1974 | Berg | 264/47 |
| 4,112,176 | 9/1978 | Bailey | 156/242 |
| 4,572,865 | 2/1986 | Gluck et al. | 264/45.3 |
| 5,385,953 | 1/1995 | McClellan | 521/109.1 |
| 5,424,014 | 6/1995 | Glorioso et al. | 264/45.3 |
| 5,531,849 | 7/1996 | Collins et al. | 156/78 |
| 5,648,421 | 7/1997 | Thiele et al. | 264/45.3 |

FOREIGN PATENT DOCUMENTS

| | | | |
|---|---|---|---|
| 136239 | 6/1979 | Germany | 264/45.3 |

*Primary Examiner*—Allan R. Kuhns
*Attorney, Agent, or Firm*—Charles D. Gunter, Jr.

[57] ABSTRACT

A novel polyurethane foam is shown which uses ground vehicle tires as a filler material. A method of manufacturing a carpet pad using the novel polyurethane composition is also shown. A frame is provided to which is mounted a conveyor belt. The conveyor belt feeds a first liner having an exposed surface of the polyurethane foam along a conveyor path from a forward end to a rearward end. A foam spray assembly is connected to a conventional uncured polymeric foam supply having a spray nozzle mounted adjacent to the forward end of the conveyor path. The spray nozzle dispenses uncured, resilient polymeric foam as a generally uniform layer on a surface of the first liner of previously cured polyurethane. A second conveyor belt, parallel to the first conveyor belt, feeds a second liner sheet along the conveyor path so that the second liner sheet is positioned over the layers of foam laminate. As the layers of foam laminate pass along the conveyor path, the foam material is sandwiched between the first and second liners and is compressed between the conveyor belts to a selected thickness. This laminated foam is then heated to cure the upper layer of foam.

12 Claims, 7 Drawing Sheets

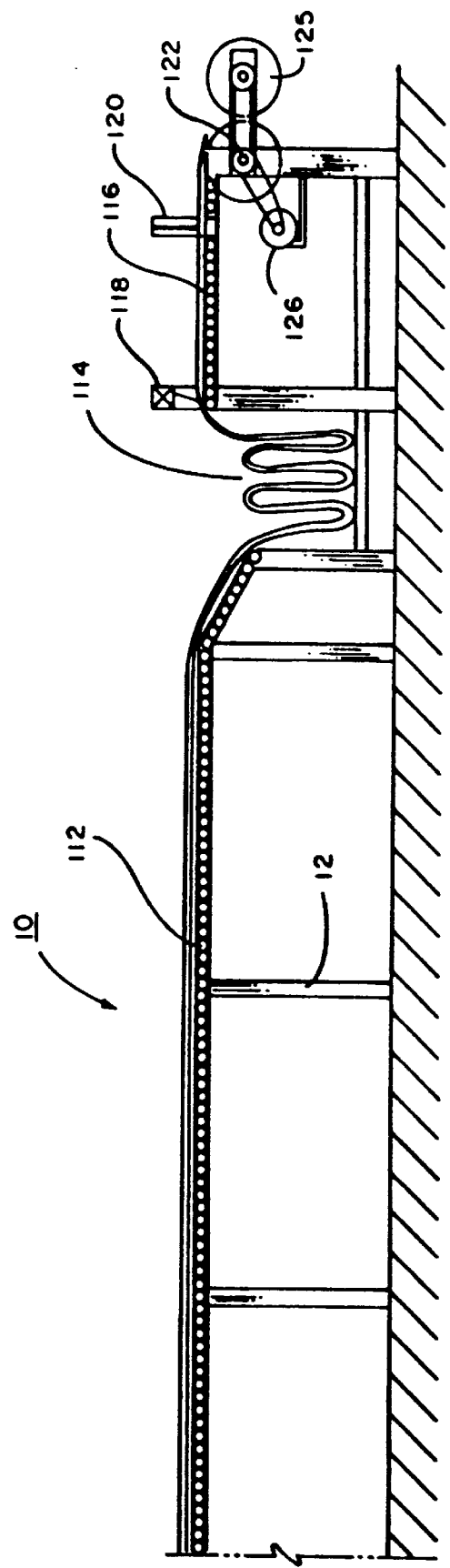

METHOD OF MANUFACTURING CARPET PADS FROM A POLYURETHANE FOAM COMPOSITION

BACKGROUND OF THE INVENTION

1. Field of the Invention

This invention relates to polyurethane foam compositions and to a method of manufacturing padding for underlying a carpet floor covering using such compositions.

2. Description of the Prior Art

Polyurethane foams are well known in the art and are typically formulated by reacting an organic diisocyanate with a polyhydroxy compound such as a polyether or polyester polyol. The reaction may be conducted in the presence of water which reacts with the diisocyanate to give off carbon dioxide to serve as a blowing agent or chemical blowing agents may be employed. Catalysts may or may not be used, depending upon the nature of the reactants employed. Also, since foaming involves bubble growth and nucleation, a surfactant will typically be included in the formulation.

A variety of fillers have been incorporated into the prior art polyurethane foam materials including both small and large sized particulate fillers, e.g., clay, sand, finely divided metals, metal oxides, carbon black, etc. Fibrous fillers have also been employed including cotton, wood, silk, glass fibers, nylon, etc. Other filler materials known in the art include low density foamed or hollow geometric shapes such as spheres or honeycomb structures.

At the present time, used or scrap vehicle tires present a significant disposable problem and environmental concern. It is not generally possible to burn used tires without polluting the atmosphere unless expensive and overly complicated containment mechanisms are utilized. Disposal techniques are thus often complicated and expensive to implement. One objective the present invention is to utilize the rubber component of used vehicle tires in the form of a finely ground powder as a filler material for the polyurethane compositions of the invention. The use of such material as a filler provides a convenient disposal avenue for used tires which is not polluting and which is economical. In addition, the rubber component of the formulation may actually improve the end properties of the polyurethane foam so produced, depending upon the end application.

One particular use of polyurethane foams is as a padding material for underlying carpeting. Such padding material usually consists of a sheet or layer of polymeric foam material which acts as a cushion to enhance the resiliency and feel of a carpet. Carpet pads usually consist of so-called "re-bond" material which is formed from small pieces of foam which are bonded together to form a sheet or layer. Typically, the re-bond padding material is used as is with only a single liner sheet or laminate. With heavy foot traffic, the foam material of these pads tends to degrade and deteriorate. These carpet pads also tend to absorb and retain liquids which are spilled and soak through the overlying carpet.

Carpet pads made from prime polyurethane foam have been manufactured as an alternative to these re-bond carpet pads. The polyurethane pads are more durable and are usually provided with a single polyethylene liner sheet bonded to one side of the foam. The liner sheet serves solely for allowing the carpet to slide easily over the pad during installation. Typically, the liner sheet is bonded to the foam material by applying pressure and heat after the polyurethane foam has already been cured. Carpet pads manufactured entirely from prime polyurethane foam are more expensive than pads manufactured from re-bond materials.

A need exists, therefore, for an improved polyurethane foam composition which is suitable for use as padding for underlying a carpet floor covering.

A need exists for such a polyurethane foam composition which is capable of withstanding foot traffic for a prolonged period of time and which is not overly expensive to manufacture.

A need also exists for a polyurethane foam and method of formulation which incorporates used vehicle tires in the form of finely ground rubber powder in order to provide a non-polluting method of disposing of used tires.

A need also exists for an improved carpet padding design which comprises a multi-layer laminate of improved strength and durability and which competes economically in price with existing re-bond and other commercially available carpet pads.

SUMMARY OF THE INVENTION

A method is shown for producing a polyurethane foam which comprises the steps of reacting together: (1) an organic isocyanate compound; (2) an organic compound having at least two active hydrogens, the organic compound being selected from the group consisting of organic acids, amines, hydroxy compounds including glycols, polyhydroxy compounds and mixtures thereof; (3) a gas providing compound; and (4) a filler material comprising finely ground used tires.

The preferred organic compounds having at least two active hydrogens can be selected from the group consisting of diols, polyols, polyalkylene glycols, polyester polyols, polyether polyols and mixtures thereof. The gas providing compound can be selected from the group consisting of water, dicarboxylic acids and chemical blowing agents. The used vehicle tires which are utilized as the filler material have been ground in a grinding operation to a particle size in the range of about 30–40 mesh. Preferably, the used vehicle tires have been washed and filtered during the grinding operation to remove any remaining nylon or metal. A preferred polyurethane foam composition is produced by reacting together about 10–75 parts filler material, 35–45 parts organic polyisocyanate material, 1–5 parts water, 0.1–3.0 parts surfactant and 0.1–3.0 parts catalyst, all parts based on 100 parts polyol component.

The process of manufacturing padding material for underlying a carpet floor covering comprises the steps of feeding a first liner laminate having a previously cured layer of polyurethane foam material with an exposed surface and a polyethylene backing layer along a conveyor path. Next, there is deposited an amount of uncured, resilient polymeric foam material on the exposed surface of the first liner laminate as the first liner laminate is fed along the conveyor path so that the foam material is deposited as a generally uniform layer over the exposed surface of the first liner laminate. A second liner sheet is positioned over the layer of uncured polymeric foam as the first liner laminate is fed along the conveyor path so that the layer of previously cured polyurethane foam material and the layer of uncured polymeric foam material are sandwiched between the first liner laminate and second liner sheet. The sandwiched layers of foam material are fed along the conveyor path between a pair of opposite facing parallel conveyor belts which are spaced apart so that the sandwiched layers of polymeric foam material are compressed. The uncured polymeric foam layer is allowed to at least partly cure as the foam materials are compressed between the conveyor belts to thereby form a composite foam laminate. The previously cured polyurethane foam material is formed by reacting together at least an organic isocyanate compound, a polyhydroxy compound, a gas providing compound and a filler material which comprises finely ground used vehicle tires.

Additional objects, features and advantages will be apparent in the written description which follows.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings, wherein:

FIGS. 1A–1C are elevational side views of an apparatus used in carrying out the method of the invention, FIG. 1B being a continuation of FIG. 1A and FIG. 1C being a continuation of FIG. 1B;

DETAILED DESCRIPTION OF THE PREFERRED EMBODIMENT

Figure 1A:
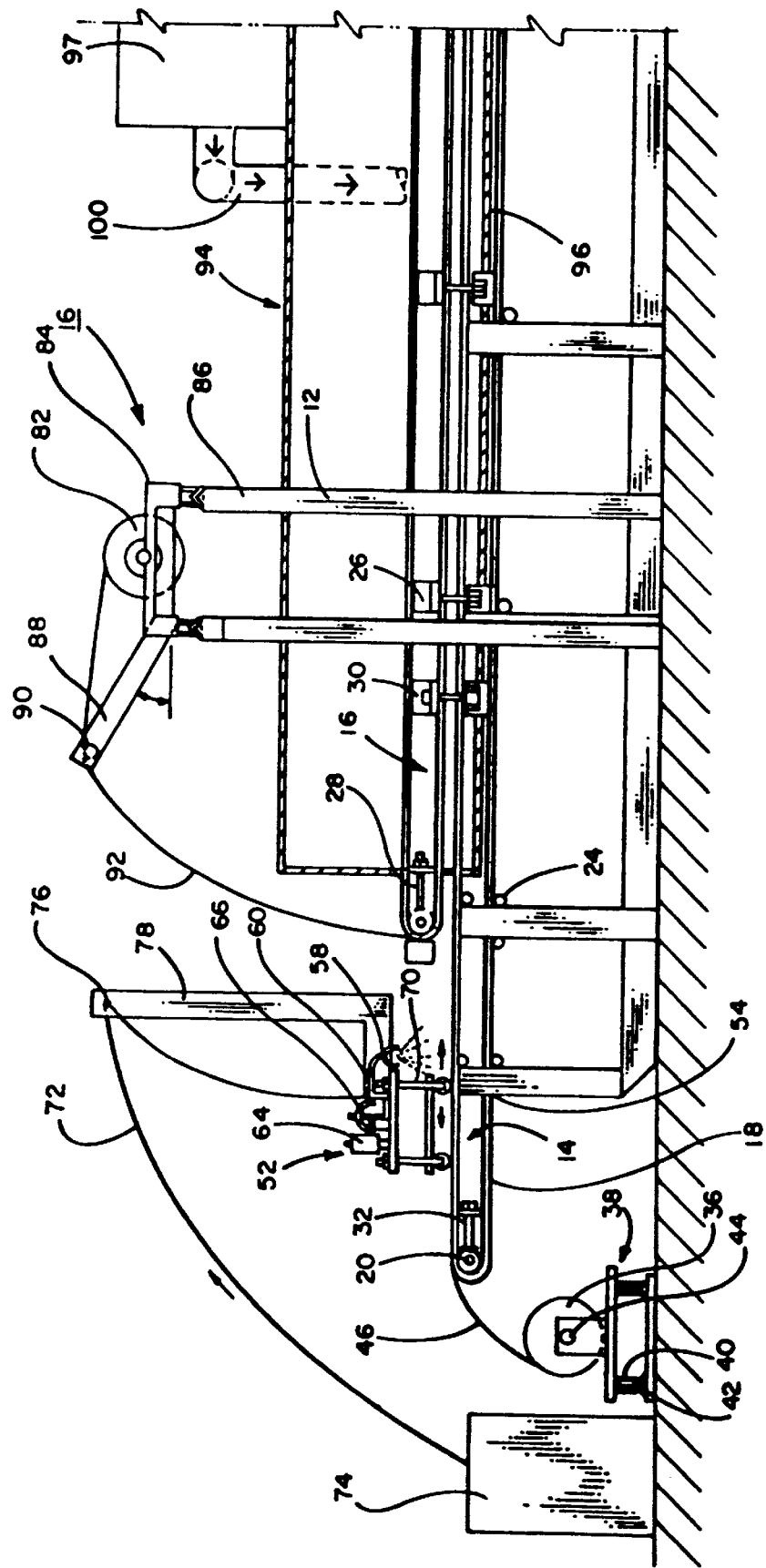

The improved polyurethane foam of the invention is prepared by a process of reacting together: (1) an organic isocyanate compound; (2) an organic compound having at least two active hydrogens, the organic compound preferably being selected from the group consisting of organic acids, amines, hydroxy compounds including glycols, polyhydroxy compounds and mixtures thereof; (3) a gas providing compound; and (4) a filler material comprising finely ground used vehicle tires.

Porous polyurethane foams of the open cell variety are well known in the art and their preparation and chemistry is discussed in such books as "Polyurethanes", by Saunders and Frisch, Interscience Publishers, John Wiley and Sons, New York, N.Y., 1962. Such compounds can be prepared, e.g., by reacting an organic diisocyanate with a hydroxy compound such as a diol or polyol, a polyoxyalkylene glycol, a polyester prepared from such hydroxy compounds, a polyether polyol, etc. In many cases, the reaction is conducted in the presence of water which reacts with the diisocyanate to give off carbon dioxide as a foaming or blowing agent, while simultaneously forming diamines for further reaction with the diisocyanate. A dicarboxylic acid, e.g., pimelic acid or sebacic acid may be used instead of water. Also, chemical blowing agents such as azo compounds, may be utilized or low boiling liquids such as trichlorofluoromethane. Catalysts may or may not be used, depending upon the individual reactants elected. In most cases, a catalyst is utilized to regulate the reaction rate, matching polymerization rate and resulting viscosity increase with gas evolution in order to assure trapping of the gas by the polymer structure. Examples of catalysts include tin compounds such as stannous oleate or dibutyltin diacetate and amines such as N-ethyl morpholine and triethylenediamine. It is also customary practice to employ a surfactant, e.g., a silicone oil such as a dimethylsiloxane in order to effect nucleation and/or stabilize the foam. Thus, the typical polyurethane foam forming components are the diisocyanate, the polyol, the gas providing compound or foam precursor, the catalyst and the surfactant.

Polyurethane foams are usually characterized as either having an open cell foam structure having interconnected cellular structures through which gases or liquids may pass, or as having closed cell structures having separate, non-connecting gas cells. The foams may be of low or high density, depending upon the relative proportion of gas cells to solid polyurethane. By convention, foams having density greater than about 3 pounds per cubic foot are referred to as high density foams. Still another classification of such foams is that of rigid or flexible foams, the former showing resistance to deformation with the latter showing flexibility and resilience.

Fillers are typically incorporated into the porous polyurethane compositions. The previously used fillers have included both small and large size particulate fillers (e.g., clay, sand, finely divided metals, metal oxides, carbon black, etc.), fibrous fillers (e.g., cotton, wool, silk, glass fibers, nylon, flexible urethane fibers, etc.) as well as low density foamed or hollow geometric shapes (e.g., spheres or honeycomb structures).

Preferably, the organic compound having at least two active hydrogens is selected from the group consisting of diols, polyols, polyalkylene, glycols, polyester polyols, polyether polyols and mixtures thereof. In the preferred embodiment which follows, the polyol component is a mixture of two polyols, a polyether polyol from Eastman Chemical (F-3020) and a grafted polyether polyol from BASF Chemical (Pluracol) Polyol 1103).

The gas providing compound is preferably selected from the group consisting of water, dicarboxylic acids and chemical blowing agents. The preferred blowing agent is water and is present in the range from about 1 to 5 parts per hundred parts by weight polyol, most preferably about 2.7 parts per hundred parts (php).

The diisocyanate compound is a commercially available TDI (Lubranate TD 80 Type 1-80:20 isomer ratio) present in the range from about 35 to 45 php, most preferably about 39.7 php based on 100 parts by weight polyol.

A suitable silicone surfactant is commercially available from Goldschmidt Chemical as Tegostab B-8021 and is present in the range from about 0.1 to 3.0 php, most preferably about 0.80 php, based on 100 parts by weight total polyol.

The catalyst system used in the preferred embodiment which follows is a combination amine catalyst from Cellular Technology (Cellcat 11) and a tin catalyst from Goldschmidt Chemical (Tin-Iso-Octoate). The amine catalyst is present in the range from about 0.1 to 3.0 php and the tin catalyst is present in the range from about 0.005 to 2.0 php, based on a total of 100 parts by weight polyol.

Other conventional additives may also be employed in the polyurethane foam compositions of the invention such as black pigment, etc.

Figure 6:
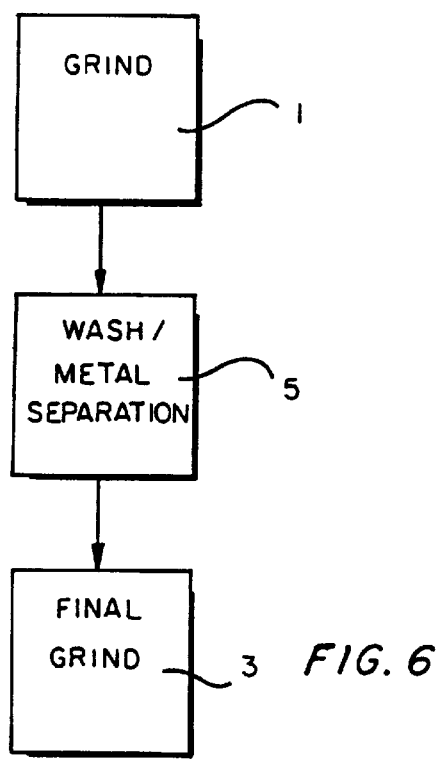
FIG. 6 is a flow diagram illustrating the steps in grinding the rubber filler material used in the polyurethane foam compositions of the invention.

The polyurethane compositions of the invention contain a novel filler material which comprises finely ground used vehicle tires. As shown in FIG. 6, the used vehicle tires, such as automobile tires, are ground to a generally uniform particle size in one or more grinding steps 1, 3 as well as being cleaned and washed in one or more steps 5 in order to remove any remaining nylon component. A metal separation step is also included in the process, such as by passing the conveyor fed material past a permanent magnet in order to remove any remaining metal belting from the ground rubber. Any of a number of commercially available grinding devices are suitable, as long as the resulting particle size of the rubber particles is in the range from about 30–40 mesh. Table I below gives a particularly preferred formulation for the polyurethane foam compositions of the invention. All components are given as parts by weight based upon 100 parts by weight of total polyol component.

TABLE I

|  | PBW |
| --- | --- |
| Polyol[1] | 25.0 |
| Graft Polyol[2] | 75.0 |
| Filler (30–40 mesh) | 50.0 |
| 80/20 TDI (125 Index)[3] | 39.73 |
| $H_2O$ | 2.7 |
| Silicone Surfactant[4] | .80 |
| Amine Catalyst[5] | .40 |
| Tin Catalyst[6] | .18 |
| Black Pigment[7] | 2.00 |

[1]Polyol
F-3020 Polyol - Eastman Chemical
Polyether Polyol (3000 MW)
[2]Graft Polyol
Pluracol Polyol 1103 - BASF Chemical
Grafted Polyether Polyol
[3]TDI
Lubricate TD 80 Type 1 - BASF Chemical & Miles
Tolylene Diisocyanate
[4]Silicone Surfactant
Tegostab B-8021 - Goldschmidt Chemical
Polyether Modified Polysiloxan
[5]Amine Catalyst
Cellcat 11 - Cellular Technology
Tertiary Amine/Glycol mixture
[6]Tin Catalyst
Kosmos 29 - Goldschmidt Chemical
Tin-Iso-Octoate
[7]Black Pigment
218 Black - Ryvec, Inc.
Polyether Polyol & Carbon Black Generally, in preparing porous polyurethane structures according to the invention, solution of the polyol and the di- or polyisocyanate are prepared separately in one or more organic liquid diluents, then mixed, poured onto a surface or into a mold and are allowed to stand in a quiescent state while the polymeric structure is forming. The reactants, once mixed, quickly begin to react, depending upon the temperature, solids content, catalyst, etc., and form a gel which is generally left undisturbed until the structure has set.

Preferably, the foams of the present invention are produced in continuous fashion so that a continuous slab of polyurethane is produced. Any of the prior art techniques for producing continuous foam slabs can be utilized. See, for example, U.S. Pat. No. 3,786,122, issued Jan. 15, 1974, entitled "Method For The Continuous Production Of A Foamed Polyurethane Slab Involving Flow From A Vessel Over a Weir Structure." With reference to FIG. 4 of the drawings, such a process utilizes a stationary mixing head 7, the output of which is connected by a conduit 9 to a vessel in the form of a trough 11. A belt conveyor 13 moves horizontally in the direction of the arrow over a stationary supporting platform 15. Between the conveyor 13 and the trough 11 is an inclined fall plate 17 and an upright support member 19 which rests against the lip 21 of the trough 11. A sheet of polyethylene liner 23 from a supply roll 25 passes upwardly over the member 17 between the member and the trough lip 21 around a roller 27, over the inclined surface of the fall plate 16 and onto the conveying reach of the conveyor 13 to thereafter move with the conveyor.

Contiguous with each edge of the sheet 23 is a vertical side sheet 29, which can also be polyethylene drawn from a supply roll and conveyed in the direction of the conveyor 13 and at the same speed as the conveyor. The side sheets 29 are supported by the rigid sidewalls 31 and comprise, with the bottom sheet 23, an open topped channel conveyor.

In operation, the mixing head 7 is fed from a manifold and one or more valves with chemical reactants of the type previously discussed suitable for producing polyurethane foam. The mixture of reactants is fed through the conduit 9 to the respective sections of the trough 11. The mixture of reactants is initially liquid as it arrives in the trough but, as the liquid level rises, the mixture begins to expand and foam due to the chemical reaction involved. The expanding foam rises upwardly in the trough and passes the lip 21 and contacts the moving sheet 23. The foam continues to rise upwardly until it arrives at the region where the sheet 23 turns over the roller 27 and moves down over the fall plate 17. The roller 27 and the region of the sheet 23 overlying the roller constitute a weir structure over which the foam flows, the foam being in a condition in which it is changing from a mainly liquid to a mainly solid state.

As the foam expands and rises in the trough 11, fresh liquid mixture is supplied to the bottom of the trough. Thus, a constant flow of solidifying foam passes over the weir and moves down the incline of the fall plate 17. The angle of inclination of the fall plate 17 with the horizontal is chosen such the foam continues to expand and retains a horizontal top surface 33. Also, the arrangement is such that when the foam reaches the bottom of the fall plate, expansion or foaming has substantially ceased and the expanded foam continues horizontally along the conveyor while foam curing takes place.

After expansion has ceased, the foam slab is allowed to cure as it continues along the horizontal conveyor. The typical foam slab is cut to a length of about 60 feet and is approximately 78 inches wide and 30 to 40 inches thick. A conventional saw mechanism is utilized to cut layers of foam which, for purposes of the present invention may be on the order of ⅜ to ½ inch in thickness. The side sheets 29 are pulled away from the slab leaving only the bottom liner sheet 23.

Figure 1B:
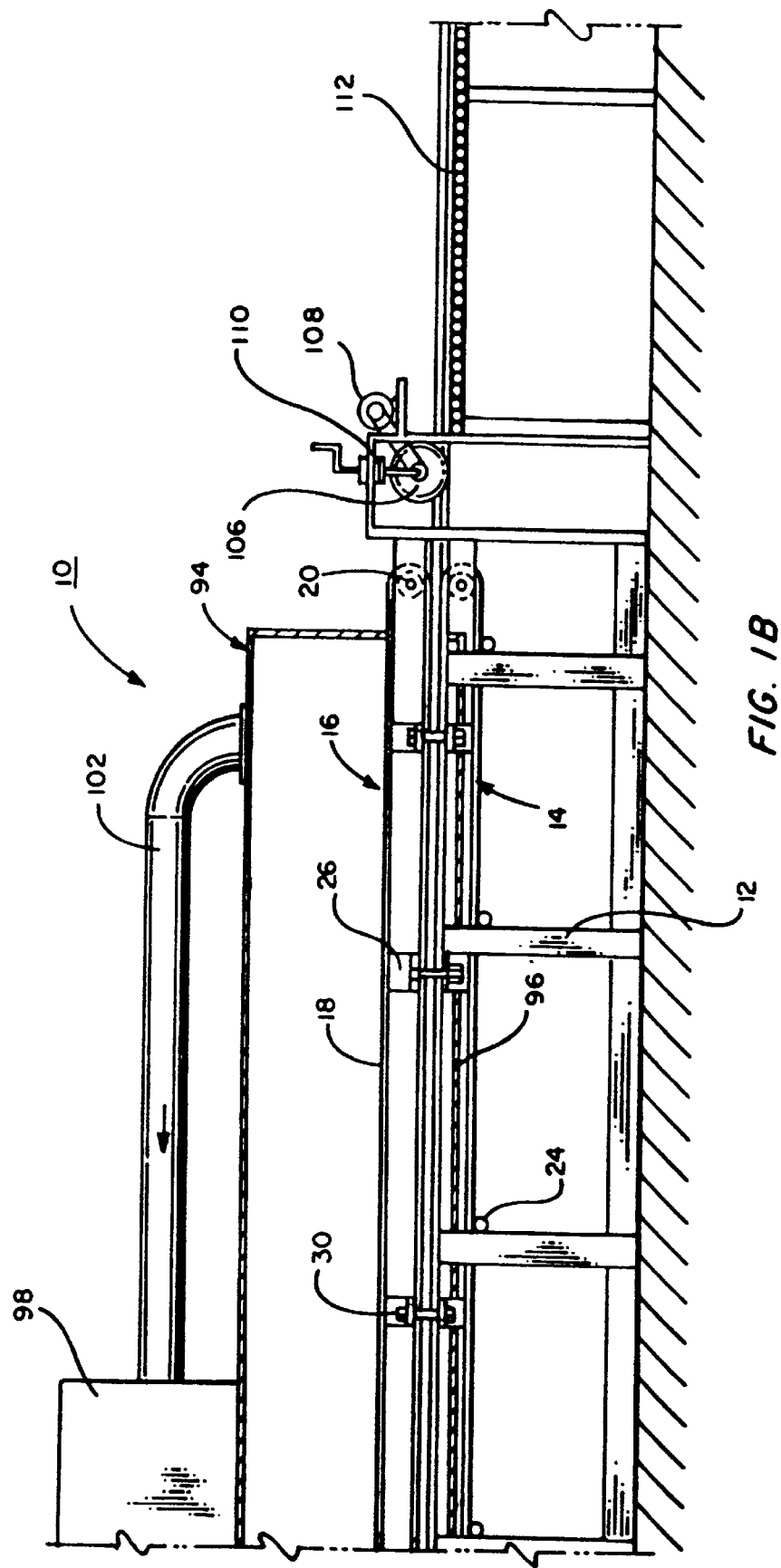
Figure 2:
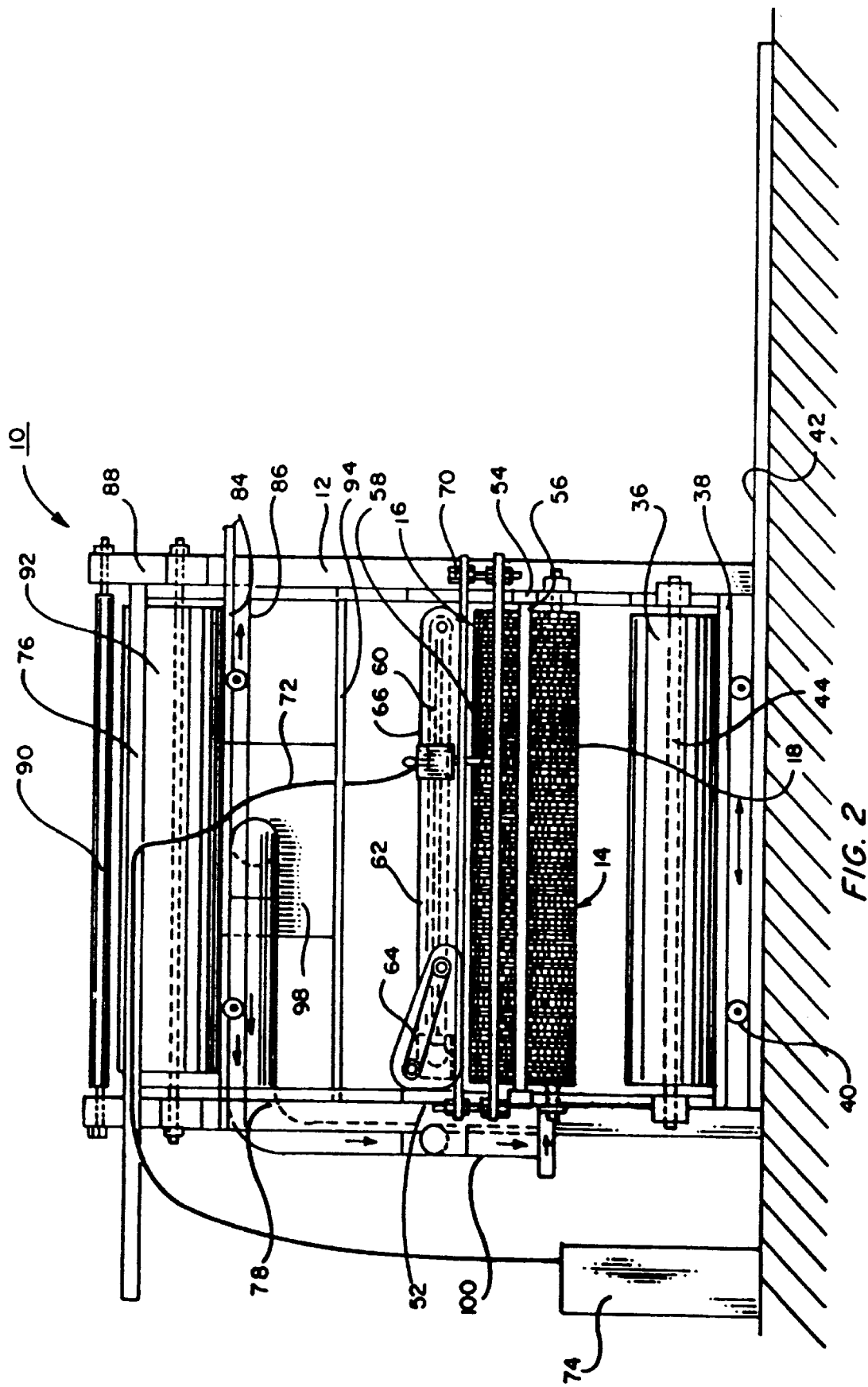
FIG. 2 is a front, elevational view of the apparatus of FIGS. 1A–1C.
Figure 3:
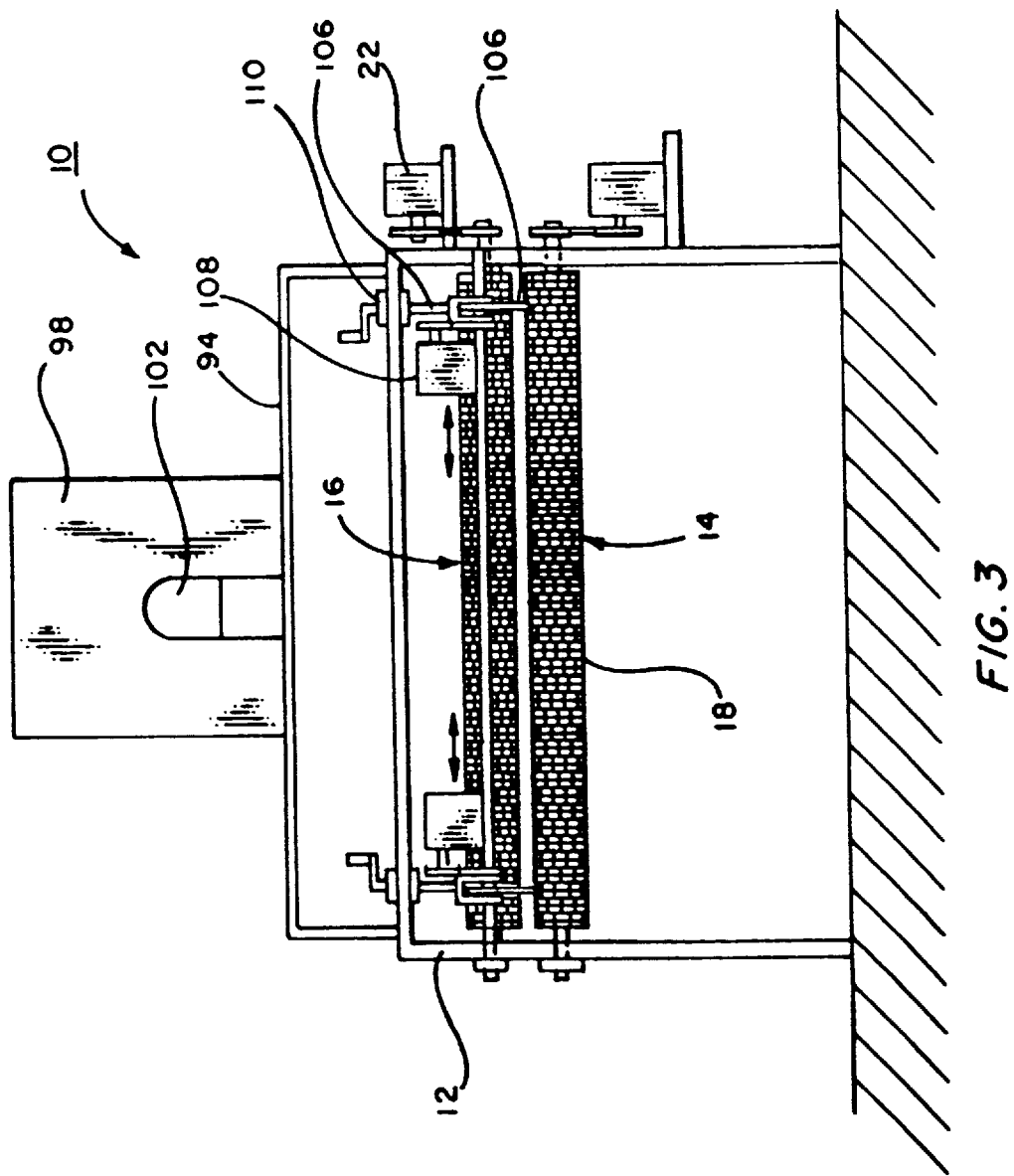
FIG. 3 is a rear elevational view of the apparatus of FIGS. 1A–1C.
Figure 5:
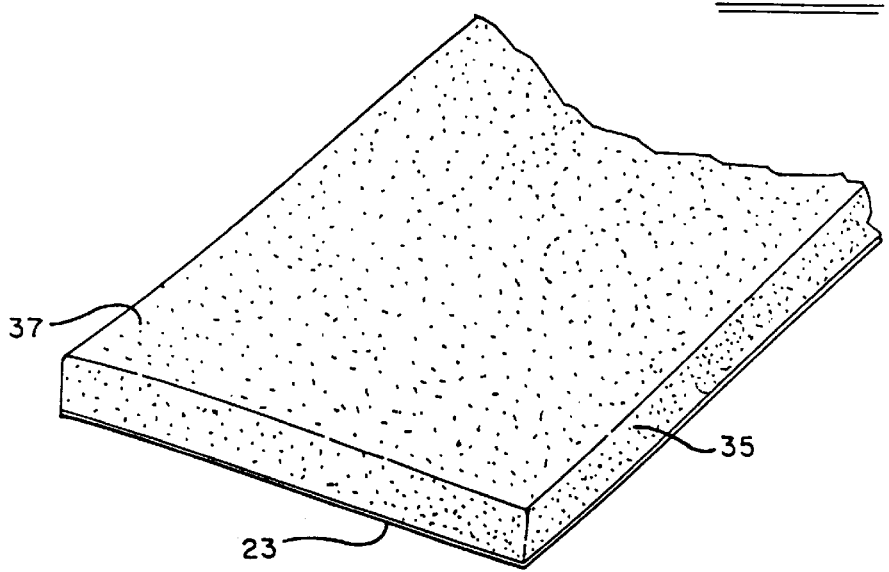
FIG. 5 is a perspective view of a section of polyurethane foam laminate which includes a layer of previously cured polyurethane foam of the invention backed by a polyethylene liner sheet.

FIG. 5 shows the completed laminate of polyurethane foam 35 which contains the vehicle tire filler and which includes the bottom liner sheet 23, as previously described. The polyurethane foam liner laminate is utilized in a process of manufacturing padding material for underlying a carpet floor covering. The process for manufacturing a carpet pad will be described primarily with reference to FIGS. 1A–1C, 2 and 3. Padding material for underlying a carpet floor covering is produced in a generally continuous fashion as it is moved along a conveyor path using the apparatus 10, as shown in FIGS. 1–3. Referring to FIGS. 1A–1C, the various components of the apparatus 10 are housed and carried by means of a framework 12. The framework 12 supports a lower conveyor 14 and an upper conveyor 16 which provide the primary means for transporting the padding material along the conveyor path as it is processed. The lower and upper conveyors 14, 16 are each constructed similarly and are comprised of a conveyor belt 18 (FIG. 2), which is a continuous chain-link belt of woven wire, mounted about sprockets 20. A suitable chain-link belt is that used with a 6-inch sprocket having 19 sprockets per shaft. As seen in FIG. 3, the sprockets 20 located at the rearward end of each conveyor 14, 16 are rotatably driven by electric motors 22. The sprockets 20, in turn, drive the conveyor belts 18 of each of the lower and upper conveyors 14, 16.

The chain-link belts 18 of the conveyors 14, 16 are supported by transverse rollers 24 and stabilizers 26 spaced at intervals along the length of each conveyor 14, 16. Tension on the conveyor belts 18 of the conveyors 14, 16 is maintained by longitudinal chain adjustment screws 28 located at the forward end of the conveyors 14, 16 for longitudinally extending or retracting the forward sprockets 20 so that slack is taken out of the conveyor belts 18. By means of the rollers 24, stabilizers 26 and tensioning screws 28, the lower surface of the upper conveyor 16 and the upper surface of the lower conveyor 14 are maintained as generally flat, even surfaces.

The lower and upper conveyors 14, 16 are spaced apart a selected vertical distance which can be varied by means of vertical adjustment screws 30. The adjustment screws 30 are conveniently spaced at various selected points along the length and on each side of the conveyors 14, 16. The adjustment screws 30 raise and lower the upper conveyor 16 relative to the lower conveyor 14, which remains stationarily fixed to the framework 12. As seen in FIGS. 2 and 3, the lower surface of the conveyor belt 18 of the upper conveyor 16 is substantially parallel to the upper surface of the lower conveyor 14.

Referring to FIG. 1A, the lower conveyor 14 extends forward several feet beyond the forward end of the upper conveyor 16. Located at the forward end of the lower conveyor 14 is a lower liner supply roll 36 which is mounted on a trolley 38. The trolley 38 is provided with wheels 40 which rest on a pair of rails 42 which allow the trolley 38 to be moved laterally away from the apparatus 10 so that the supply rolls can be easily changed by means of a fork lift or other means. The trolley 38 and supply roll 36 can then be moved into alignment with the conveyors 14, 16.

The lower supply roll 36 is mounted on a roll shaft 44 which is transverse to the direction of movement of the lower conveyor 14. The lower supply roll 36 supplies a generally continuous length of liner laminate 46 which is fed to the upper surface of the lower conveyor 14. The liner laminate 46 is comprised of the previously described layer of polyurethane foam (35 in FIG. 5) about ⅜ inch thick having the polyethylene backing 23 of a thickness ranging from about 0.5 to 1 mil. The liner laminate 46 has an exposed top surface 37.

Mounted above the lower conveyor 14, adjacent to the forward end, is a spray assembly 52 which is mounted on wheels 54. The wheels 54 rest on tracks 56 of the frame 12 on either side of the lower conveyor 14 to allow longitudinal positioning of the spray assembly 52 over the lower conveyor 14. The spray assembly 52 is provided with a spray nozzle 58 mounted to a transverse slide bar 60 (FIG. 2). The spray nozzle 58 is movable back and forth along the transverse slide bar 60 by means of a continuous roll chain 62 which is driven by an electric motor 64. A chain guard 66 covers the roll chain 62. The spray assembly 52 can be raised or lowered to vary the height of the spray nozzle 58 from the upper surface of the lower conveyor 14 by means of adjustment screws 70 located on either side of the lower conveyor 14.

A foam supply hose 72 connects the spray nozzle 58 with a foam metering system 74 for metering components of a conventional polyurethane foam used in the manufacture of the carpet padding. The foam metering equipment 74 is of conventional design and can be any such equipment known to those skilled in the art for producing polyurethane foam suitable for the manufacture of carpet padding. A suitable foam metering system is that marketed as the "Gusmer M-2000" foam equipment. The foam hose 72 is supported by means of a hose support 76 which is suspended over the lower conveyor 14 and spray assembly 52 by means of an arm 78 of the framework 12. A limited amount of slack is provided in the hose 72 to prevent the hose 72 from interfering with the movement of the spray assembly 52 or spray nozzle 58.

Suspended above the upper conveyor 16 is an upper liner supply roll 82 which is supported on a trolley 84, similar to the trolley 38. The upper trolley 84 rests on a trolley support 86 of the frame 12 to allow lateral movement of the trolley 84 for easy access and changing of the supply roll 82. The trolley 84 is provided with a pair of laterally spaced apart, forward extending arms 88 which carry a transverse roller 90. An upper liner sheet 92 supplied from the upper liner supply roll 82 is fed over the roller 90 to the forward end of the upper conveyor 16 so that it engages the lower surface of the upper conveyor 16. The upper liner sheet 92 differs from liner 46 in that it is comprised solely of a sheet of low density polyethylene having a thickness of about 0.5 to 1.0 mil.

A heat cover 94 is mounted to the framework 12. The heat cover 94 is formed from approximately one-inch thick insulating sheet material. The heat cover 94 extends substantially along the entire length of the upper conveyor 16 and is generally configured to surround the lower and upper conveyors 14, 16 with the lower wall 96 of the heat cover 94 being located between the upper and lower portions of the conveyor belt 18 of the lower conveyor 14. Heated air is introduced into the heat cover 94 by means of an air heater 98 consisting of a blower and heating element (not shown) for heating air and discharging it into a heat discharge manifold 100. The heat cover 94 is provided with a number of vents or openings (not shown) which are located along the length of the heat cover 94 adjacent to the upper and lower conveyors 14, 16. The vents or openings communicate with the discharge manifold 100 so that heated air is directed generally along the entire length of the lower and upper conveyors 14, 16. A heat return duct 102 is also provided at the rearward end of the heat cover 94, as shown in FIG. 1B. The heat return duct 102 is connected to an intake of the heater 98 for recirculating heated air exhausted from the heat cover 94.

Located to the rear of the lower and upper conveyors 14, 16 are a pair of trim saws 106 which are laterally spaced apart a selected distance. The trim saws 106 are radial-type saws which are parallel to each other and oriented vertically for trimming the edges of the carpet padding as it is moved along the conveyor path from the lower and upper conveyors 14, 16. The trim saws 106 are each driven by an electric motor 108, as shown in FIG. 3. Saw adjusters 110 allow the trim saws 106 to be positioned both vertically, to various depths, and laterally inward or outward, depending upon the width of the carpet padding desired.

Located to the rear of the trim saws 106 is a roller table 112 which extends rearward several feet to a holding stage 114. The holding stage 114 is essentially a box or bin for collecting carpet padding as it is fed from the trim saws 106 to provide an area of slack as the carpet padding is further processed downstream. Located immediately adjacent to the rear of the holding stage 114 is a second roller table 116. The second roller table 116 is provided with a mechanical counter 118 which counts a preselected length of the carpet padding as it is fed from the holding stage 114 to a transverse cut-off shear 120. The cut-off shear 120 cuts the carpet padding to the desired length after the counter has counted the preselected number of feet. Rollers 122 for packaging the cut carpet padding are provided to the rear of the cutoff shear 120 and are powered by a motor 126. The rollers 122 reel the carpet padding into rolls 125 for storage and eventual shipping and use.

The carpet padding is produced as follows. First, the lower liner laminate 46 having the exposed polyurethane upper surface (37 in FIG. 5) is fed from the supply roll 36 mounted on the trolley 38 to the upper surface of lower conveyor 14. Initially, it may be necessary to hand feed the lower liner laminate 46 or otherwise secure the liner laminate 46 to the lower conveyor so that the liner laminate 46 is fed to the spray assembly 52. As the motors 22 rotate rear sprockets 20, the chain conveyor belt 18 of each conveyor 14, 16 is continuously driven to provide a conveyor path along which the carpet padding is formed and transported. As shown in FIG. 1A–1C, the direction of the conveyor path is from left to right, beginning at the forward end of the lower conveyor 14 and ending at the roller 122 where the carpet padding is collected. The conveyor speed may vary but is usually between 10 to 20 feet per minute. As the lower liner laminate 46 is fed by the lower conveyor 14, components of the conventional foam used in manufacturing the carpet padding are fed from the foam metering system 74 through the hose 72 to the spray nozzle 58 of the spray assembly 52.

The conventional polyurethane foam which is applied on top of the previously cured liner laminate 46 is formed by the reaction of polyols with di-or polyisocyanates, as previously discussed. These components are metered by means of the metering equipment 74, which also meters the catalysts, surfactants, color additives, and water with the polyol and isocyanates, to produce a high resiliency, open cell polyurethane foam. The isocyanate component is preferably supplied by 4, 4' diphenylmethane diisocyanate (MDI) and polymeric MDI. The polyols may be either hydroxyl-terminated polyethers or hydroxyl terminated polyesters. A suitable polyol is that marketed as "B Side System Resin (Flexible)" available from AM & Associates, Huntington Beach, Calif. The polyols are typically capped, for example with ethylene oxide, to give a high resiliency foam. Suitable catalysts used for forming the polyurethane foam include amine catalysts, such as triethylenediamine and bis(dimethylaminoethyl)ether or blends thereof. Amounts of organotin catalysts may also be used. A silicone surfactant is also used. It is within the scope of the invention that a variety of formulations could be used to provide a suitable conventional polyurethane foam to form the top layer of the laminated carpet padding using the method of the invention.

The polyol and isocyanate components from the metering system 74 react upon being dispensed from the spray nozzle 58 of the spray assembly 52. The spray nozzle may be positioned at a variety of heights above the lower liner laminate 46 to provide a suitable spray pattern. Preferably, the spray nozzle 58 dispenses a pattern of foam approximately 6 to 7 inches wide. In order to provide a generally uniform layer of foam on the lower liner laminate 46, the spray nozzle 58 is reciprocated back and forth along the transverse slide bar 60 by means of the motor 64 and chain 62 as the lower liner laminate 46 is fed along the conveyor path. The rate of movement of the spray nozzle 58 may have to be adjusted based upon the amount of foam dispensed and the dimensions of the spray pattern. The spray patterns dispensed by the spray nozzle 58 should touch or overlap so that the whole surface of the liner laminate 46 is completely covered with as it is moved along the conveyor path. The amount of foam deposited should be enough to provide a layer of free rise polyurethane foam having a density of approximately 2.5 pounds per cubic foot without being compressed or molded. The final density of the foam of the carpet padding will be higher, however, due to the subsequent molding process which is later described.

As the foam is applied to the surface of the liner laminate 46, the foam will begin to expand. As this is happening, the second or upper liner sheet 92 is positioned and applied to the foam layer as it reaches the forward end of the upper conveyor 16. The lower and upper conveyors 14, 16 are spaced apart a distance of between about ¼ to ⁹⁄₁₆ of an inch, with about ⅜ to ½ inch being preferred. This molds the foam layer so that the conventional polyurethane foam is compressed to a density of approximately 6.0 pounds per cubic foot. The space between the lower and upper conveyors 14, 16 should be uniform for the entire length of the conveyors 14, 16 to ensure that the foam layer has a uniform thickness.

As the sandwiched layers of polyurethane foam material travel along the conveyor path between the lower and upper conveyors 14, 16, the foam is cured by means of the heated air introduced into the heat cover 94 by the air heater 98. Curing of the upper layer of polyurethane foam by heating increases the reaction rate of the reacting polyol and isocyanate components and adds to the dimensional stability of the foam. The temperature within the heat cover 94 should be maintained between approximately 100° to 200° F., with a temperature between about 150° to 160° F. being preferred. Temperatures above 200° F. could possibly melt the low density polyethylene liner sheets 46, 92, thereby damaging the finished padding material, and should therefore be avoided. Typically, a residence time of between 5 to 6 minutes is required within the heat cover 94 to fully cure the polyurethane foam. Preferably, the conveyors 14, 16 and heat cover 94 are of such a length as to provide this residence time under normal conveyor speeds. It should be noted, however, that the upper layer of polyurethane foam need not be fully cured upon exiting the heat cover. In such cases, the polyurethane foam may be processed and allowed to cure under normal ambient conditions with little, if any, detrimental effect.

Figure 7:
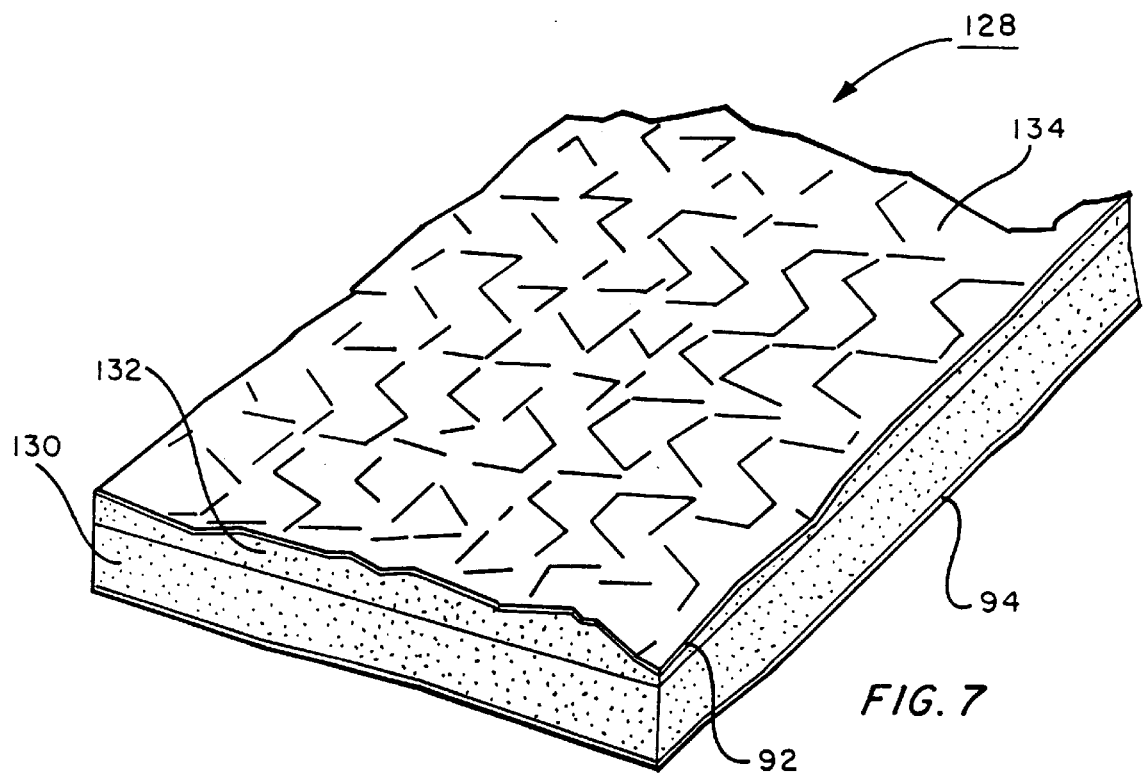
FIG. 7 is a perspective view of a section of the improved carpet padding material constructed in accordance with the method of the invention.

As the polyurethane foam is compressed between the lower and upper conveyors 14, 16, the lower liner laminate 46 is pressed against the curing polyurethane foam layer 130 (FIG. 7) so that the lower liner laminate 46 and upper liner sheet 92 permanently adhere to the polyurethane foam layers to thereby form a composite foam laminate (128 in FIG. 7). A preferred liner sheet material for use with the curing polyurethane foam is the "SF-22" low density polyethylene film, available from Consolidated Thermoplastics Company, Dallas, Tex.

As the laminated foam exits the rearward end of the conveyors, 14, 16, the edges of the foam laminate are trimmed by means of the trim saws 106. The distance between the trim saws 106 can be adjusted by means of the saw adjusters 110 so that the carpet padding is cut to desired widths. From the trim saws 106, the conveyors 14, 16, continue to feed the foam laminate rearward to the roller table 112 and to the holding stage 114. The holding stage 114 provides an amount of slack as the laminated foam is fed past the counter 118 of the roller table 116 and through the cut-off shear 120 by the motor driven roller 122 for packaging. When the counter 118 counts the preselected number of feet, the motor 126 will be stopped causing the roller 122 to pause momentarily. The shear 120 then cuts the carpet padding to form the finished rolls 125 of carpet padding. The rolls 125 of carpet padding are then removed and empty rollers 122 are replaced so that the process continues.

Figure 4:
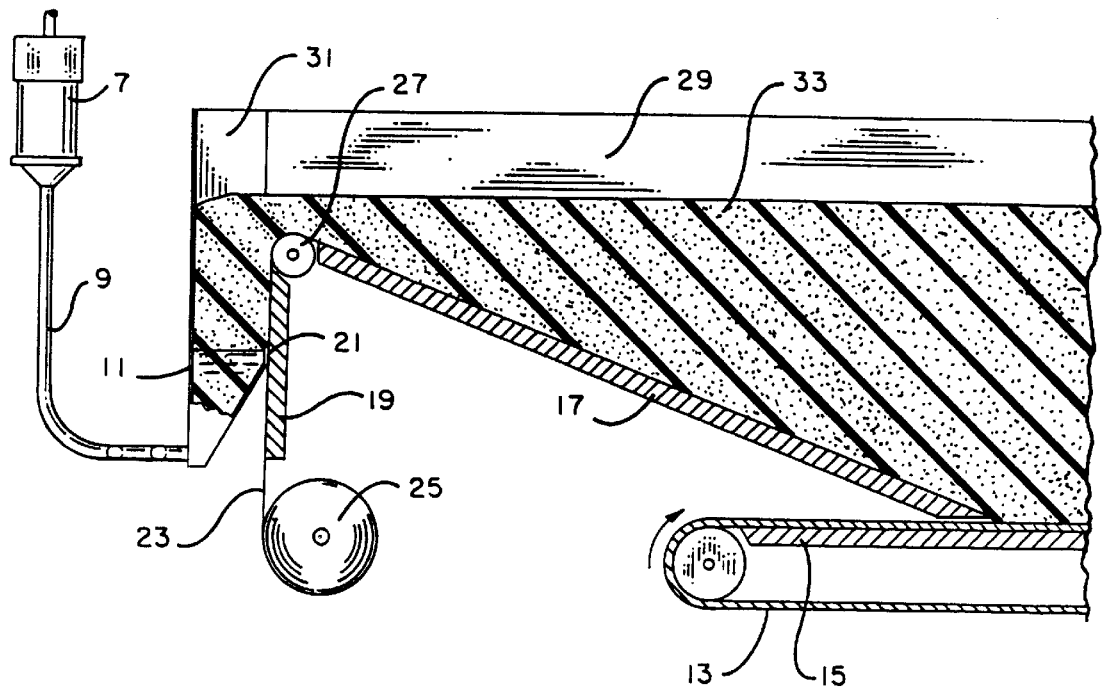
FIG. 4 is a view of a prior art apparatus used to produce a continuous slab of the polyurethane composition of the invention.

Referring to FIG. 4, a finished section of carpet padding 128 is shown which is constructed in accordance with the method of the invention. The carpet padding 128 has a polyurethane foam bottom layer 130 formed of the polyurethane foam composition of the invention having the filler of ground vehicle tires and a polyurethane foam upper layer 132. The foam laminate layers 130, 132 are surrounded by and bonded to the upper and lower polyurethane sheets 92, 94, respectively. The resulting padding 128 is a double-sided composite laminate of more sturdy construction than the typical prior art materials, such as re-bond. The surfaces of the carpet padding 128 are imprinted with a chain imprint 134 which creates a decorative appearance. This imprinted pattern is permanently formed on the carpet padding due the pressure exerted by the woven chain-link belts 18 of the conveyors 14, 16 as the polyurethane foam is curing.

The method and composition of the invention produce a more durable and aesthetically pleasing carpet pad. The two polyethylene liners on either side of the foam inner laminate layers prevent unraveling or degrading caused by heavy foot traffic which would other wise occur with the re-bond carpet padding. The polyethylene liners also provide a moisture barrier to prevent liquid spilled onto the overlying carpet from penetrating and soaking the polyurethane foam laminate layers. The method of manufacturing the carpet pad is simple and provides a continuous sheet of carpet padding. The liners adhere readily to the polyurethane foam layers as the foam is curing without the need for applying heat and pressure after the foam has cured, as in prior art methods, so that the integrity of the polyurethane foam is not compromised.

The novel foams used for the bottom layer of the laminate contain ground vehicle tires as a filler, providing a convenient and economical method of disposing of these materials without danger to the environment.

While the invention has been shown in only one of its forms it should be apparent to those skilled in the art that it is not so limited but is susceptible to various changes to that departing from the scope of the invention.

What is claimed is:

1. A process of manufacturing padding material for underlying a carpet floor covering, the method comprising the steps of:
    feeding a first liner having a previously cured layer of polyurethane foam material with an exposed surface along a conveyor path;
    depositing an amount of uncured, resilient polymeric foam material on the exposed surface of the first liner as the first liner is fed along the conveyor path so that the foam material is deposited as a generally uniform layer over the exposed surface of the first liner;
    positioning a second liner sheet over the layer of polymeric foam material as the first liner is fed along the conveyor path so that the layer of previously cured polyurethane foam material and uncured polymeric foam material are sandwiched between the first liner and second liner sheet;
    feeding the sandwiched layers of foam material along the conveyor path between a pair of opposite facing parallel conveyor belts which are spaced apart so that the sandwiched layers of polymeric foam material are compressed;
    allowing the uncured polymeric foam layer to at least partly cure as the foam materials are compressed between the conveyor belts to thereby form a foam laminate; and
    wherein the previously cured polyurethane foam material is formed by reacting together:
        an organic isocyanate compound;
        organic compound having at least two active hydrogens, the organic compound being selected from the group consisting of organic acids, amines, hydroxy compounds including glycols, polyhydroxy compounds and mixtures thereof;
        a gas providing compound; and
        a filler material comprising finely ground used vehicle tires.

2. The process of claim 1, wherein the previously cured polyurethane foam is formed by reacting together:
    an organic polyisocyanate;
    a hydroxyl-containing polyol component selected from the group consisting of polyester and polyether type polyols and combinations thereof;
    a gas providing compound;
    a suitable catalyst for carrying out a polyurethane foaming reaction and promoting polymerization between the hydroxyl-containing polyol and the organic polyisocyanate;
    a surfactant;
    a filler material comprising finely ground used vehicle tires.

3. The process of claim 2, wherein the filler material is used vehicle tires which have been ground in a grinding operation to have a particle size in the range from about 30–40 mesh.

4. The process of claim 3, wherein the used vehicle tires have been washed and filtered during the grinding operation to remove any remaining nylon or metal.

5. The process of claim 4, wherein the polyurethane foam is produced by reacting together about 10–75 parts filler material, 35–45 parts organic polyisocyanate material, 1–5 parts water, 0.1–3.0 parts surfactant and 0.1–3.0 parts catalyst, all parts based on 100 parts polyol component.

6. The method of claim 5, wherein:
    uncured polymeric foam material is deposited by means of a movable spray head assembly which moves at generally right angles in relation to the conveyor path.

7. The method of claim 6, wherein:
    at least one of the conveyor belts is a continuous chain-link belt which imprints a corresponding chain-link pattern onto at least one surface of the foam laminate.

8. The method of claim 7, wherein:
    the liner sheets are formed from polyethylene.

9. The method of claim 8, wherein:
    the uncured polymeric foam material is cured by heating the foam material as the sandwiched layer is conveyed along the conveyor path between the conveyor belts.

10. The method of claim 9, wherein:

heating is accomplished by directing heated air over the sandwiched layers of foam material while the sandwiched layers of foam material are compressed between the conveyor belts along the conveyor path.

11. The method of claim 10, wherein:

the heated air is directed over the sandwiched layers of foam material by introducing the heated air into a heat cover which surrounds the conveyor belts along the conveyor path.

12. The method of claim 11, wherein:

the first and second liner sheets each have a generally continuous length; and further comprising cutting the foam laminate into desired dimensions as the laminate is fed from the conveyor belts.

* * * * *